US009378703B2

(12) United States Patent
Nakano

(10) Patent No.: US 9,378,703 B2
(45) Date of Patent: Jun. 28, 2016

(54) KVM SWITCH AND COMPUTER READABLE MEDIUM

(75) Inventor: Tomonori Nakano, Tokyo (JP)

(73) Assignee: FUJITSU COMPONENT LIMITED, Tokyo (JP)

(*) Notice: Subject to any disclaimer, the term of this patent is extended or adjusted under 35 U.S.C. 154(b) by 1112 days.

(21) Appl. No.: 12/320,660

(22) Filed: Jan. 30, 2009

(65) Prior Publication Data

US 2010/0194676 A1 Aug. 5, 2010

(51) Int. Cl.
*G09G 5/00* (2006.01)
*G09G 5/391* (2006.01)
*G06F 3/023* (2006.01)

(52) U.S. Cl.
CPC ............. *G09G 5/006* (2013.01); *G06F 3/023* (2013.01); *G09G 5/391* (2013.01); *G09G 2340/0414* (2013.01); *G09G 2340/0421* (2013.01); *G09G 2360/02* (2013.01); *G09G 2370/24* (2013.01)

(58) Field of Classification Search
CPC ..... G06G 3/023; G06G 3/14; G09G 2370/24; G09G 5/006; G09G 2340/0407; G09G 2340/12; G09G 5/391; G09G 2340/0414; G09G 2340/0421; G09G 2360/02; G06F 3/023; G06F 3/038; G06F 21/93; G06F 3/14
USPC ................... 345/132, 156, 698–699, 3.3–2.4, 345/3.3–3.4
See application file for complete search history.

(56) References Cited

U.S. PATENT DOCUMENTS

| 5,917,552 A * | 6/1999 | Van Court .............. G09G 5/006 348/555 |
| 6,615,272 B1 * | 9/2003 | Ambrose ...................... 709/238 |
| 6,670,964 B1 * | 12/2003 | Ward et al. .................... 345/660 |
| 2001/0002833 A1 * | 6/2001 | Narui ............................. 345/418 |
| 2004/0239676 A1 * | 12/2004 | Yoo ............................... 345/501 |
| 2005/0035982 A1 * | 2/2005 | Hong et al. .................... 345/698 |
| 2005/0044184 A1 * | 2/2005 | Thomas et al. ............... 709/219 |
| 2008/0062121 A1 * | 3/2008 | Huang et al. .................. 345/156 |

FOREIGN PATENT DOCUMENTS

| JP | 2003-534685 | 11/2003 |
| JP | 2005-18135 | 1/2005 |
| WO | WO 01/84291 A1 | 11/2001 |

OTHER PUBLICATIONS

Japanese Office Action for application No. 2008-023375 issued Nov. 20, 2012.

* cited by examiner

*Primary Examiner* — Matthew Fry
(74) *Attorney, Agent, or Firm* — Staas & Halsey LLP

(57) ABSTRACT

A KVM switch that is connected between servers, and at least one set of a keyboard, a mouse and a monitor, comprising: an acquiring portion that acquires information showing a screen resolution to which the monitor is capable of adapting, from the monitor; an analysis portion that analyzes a screen resolution of a video signal output from a corresponding server, based on a horizontal synchronizing signal and a vertical synchronizing signal received from each of the servers; a determination portion that determines whether the analyzed screen resolution exceeds the screen resolution shown by the acquired information; a conversion portion that, when the analyzed screen resolution exceeds the screen resolution shown by the acquired information, converts the analyzed screen resolution into the screen resolution shown by the acquired information; and an output portion that outputs the video signal having the converted screen resolution to the monitor.

7 Claims, 11 Drawing Sheets

KVM SWITCH AND COMPUTER READABLE MEDIUM

CROSS-REFERENCE TO RELATED APPLICATIONS

The Present application is based on Japanese Patent Application No. 2008-023375 filed Feb. 1, 2008, the entire disclosure of which is hereby incorporated by reference.

BACKGROUND OF THE INVENTION

1. Field of the Invention

The present invention relates to a KVM switch and a computer readable medium.

2. Description of the Related Art

Conventionally, there has been known a KVM switch (K: keyboard, V: video, M: mouse) which is connectable to a plurality of computers, and peripheral equipment such as a keyboard, a mouse and a monitor for inputting and outputting signals to the plurality of computers (see Japanese Patent Application Publication No. 2005-18135). The KVM switch can switch a computer which the peripheral equipment accesses, to other computer.

However, the conventional KVM switch can connect to various types of servers. Therefor, if the monitor is not adapted to a screen resolution of a video signal from a specific server, the monitor may not be able to display the video signal from the server. In this case, if a monitor having a high resolution is not used, the video signal from the server cannot be displayed.

SUMMARY OF THE INVENTION

It is an object of the present invention to provide a KVM switch and a computer readable medium that can let a user use a monitor without minding a screen resolution of a video signal from each server.

According to a first aspect of the present invention, there is provided a KVM switch that is connected between a plurality of servers, and at least one set of a keyboard, a mouse and a monitor, including: an acquiring portion that acquires information showing a screen resolution to which the monitor is capable of adapting, from the monitor, an analysis portion that analyzes a screen resolution of a video signal output from a corresponding server, based on a horizontal synchronizing signal and a vertical synchronizing signal received from each of the plurality of servers; a determination portion that determines whether the analyzed screen resolution exceeds the screen resolution shown by the acquired information; a conversion portion that, when the analyzed screen resolution exceeds the screen resolution shown by the acquired information, converts the analyzed screen resolution into the screen resolution shown by the acquired information; and an output portion that outputs the video signal having the converted screen resolution to the monitor.

With the above arrangement, a user can use the monitor without minding the screen resolution of the video signal from each server.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of an embodiment of the present invention.

Figure 1:
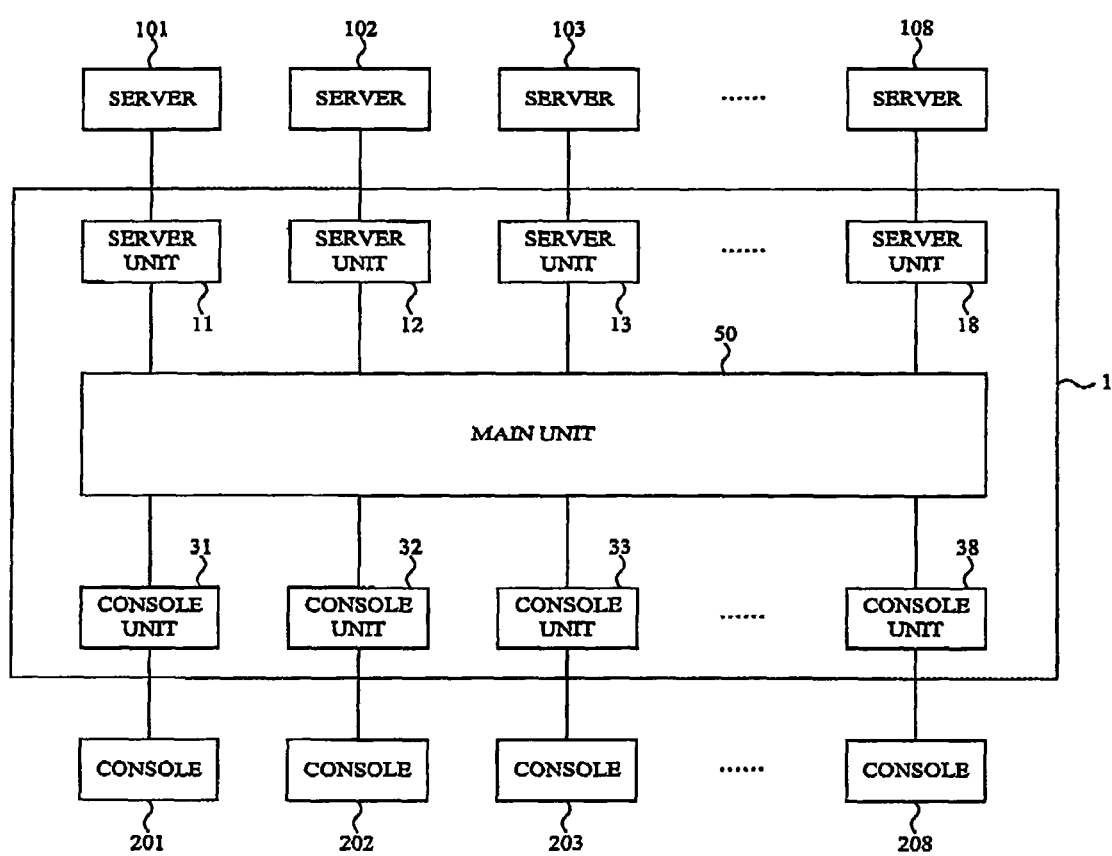
FIG. 1 is a diagram showing the construction of an information processing system including a KVM switch according to a present embodiment.

FIG. 1 is a diagram showing the construction of an information processing system including a KVM switch according to a present embodiment.

The information processing system in FIG. 1 includes servers 101 to 108, a KVM switch 1, and consoles 201 to 208. The KVM switch 1 can connect up to eight sets of the server and the console. Each of the consoles 201 to 208 includes a monitor, a keyboard, and a mouse. Hereinafter, the monitor is represented by adding a sign "a" to a reference number of the corresponding console, and the keyboard and the mouse are represented by adding a sign "b" to a reference number of the corresponding console.

The KVM switch 1 includes server units 11 to 18, a main unit 50, and console units 31 to 38. The server units 11 to 18 are connected to the servers 101 to 108, respectively, and the console units 31 to 38 are connected to the consoles 201 to 208, respectively. Cables with a longest length of about 100 meter are connected between the server units 11 to 18 and the main unit 50, and cables with a longest length of about 300 meter are connected between the console units 31 to 38 and the main unit 50.

The main unit 50 in the KVM switch 1 selectively switches a set of console operating one server to other set of console. That is, one server receives data of the mouse and the keyboard from one set of console, and a RGB signal from the server is output to the monitor included in the console.

Although in the present embodiment, the KVM switch 1 is separated to the server units 11 to 18, the main unit 50, and the console units 31 to 38, anyone of the console units 11 to 18 or the server units 31 to 38, or both of them may be integrated with the main unit 50.

Figure 2:
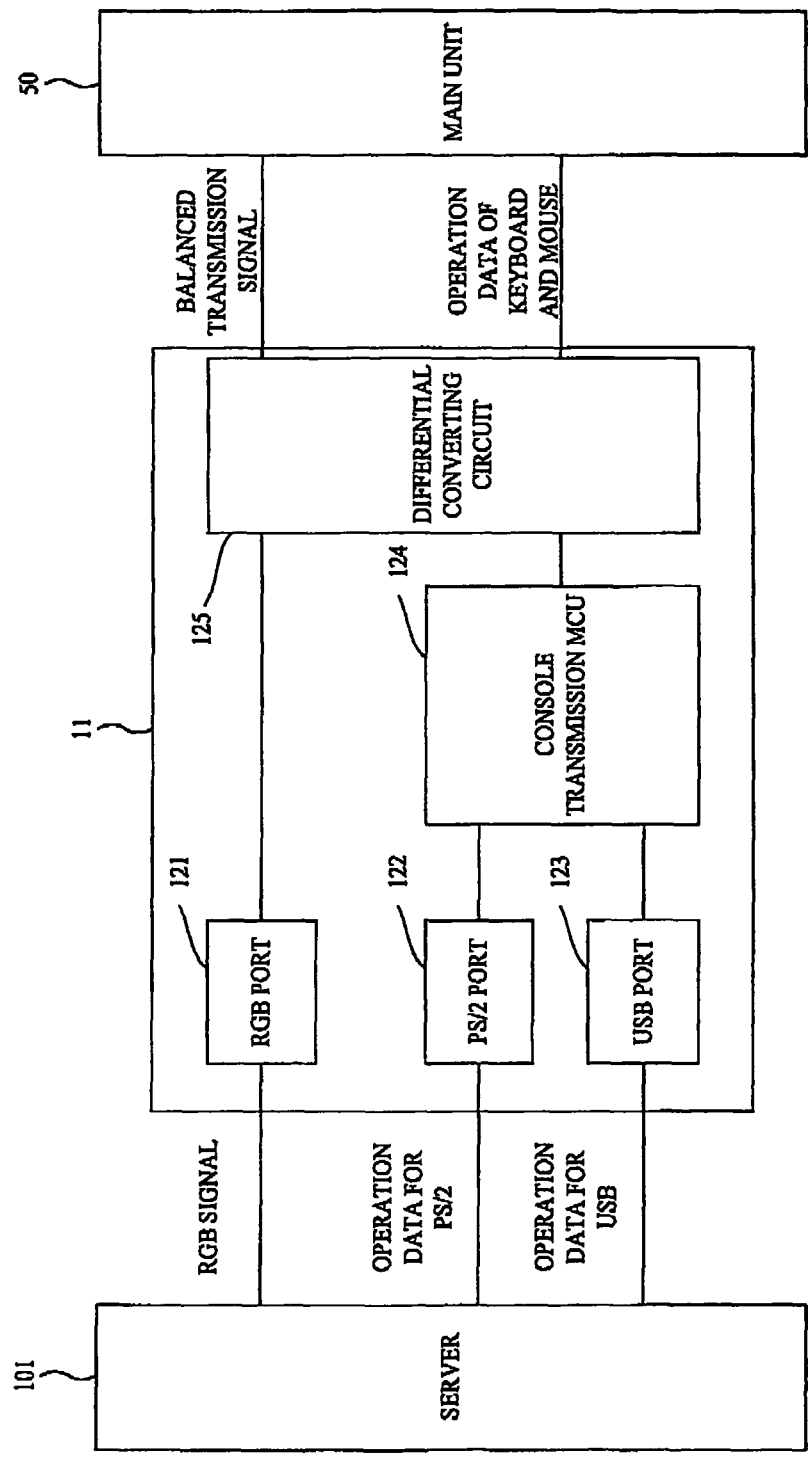
FIG. 2 is a diagram showing the construction of a server unit 11.

FIG. 2 is a diagram showing the construction of the server unit 11.

The server unit 11 includes a RGB port 121, a PS/2 port 122, a USB (Universal Serial Bus) port 123, a console transmission MCU (Micro Controller Unit) 124, and a differential converting circuit 125.

The RGB port 121 is connected to the server 101, receives the RGB signal, a horizontal synchronizing signal and a vertical synchronizing signal from the server 101, and outputs these signals to the differential converting circuit 125. The differential converting circuit 125 combines the RGB signal with the horizontal synchronizing signal and the vertical synchronizing signal, converts the combined RGB signal into a balanced transmission signal, and outputs the balanced transmission signal to the main unit 50. Moreover, the differential converting circuit 125 receives operation data of the keyboard and the mouse from the main unit 50, converts the operation data into operation data for the PS/2 port 122 or the USB port 123, and outputs the converted operation data to the console transmission MCU 124.

The console transmission MCU 124 outputs the operation data for the PS/2 port 122 or the USB port 123 to the server 101 via the PS/2 port 122 or the USB port 123. The server unit 11 further may include a COM port (communication port) for connecting external equipment thereto. In addition, the USB port 123 can connect to USB equipment other than the server. It should be noted that the construction of the other server units is the same as that of the server unit 11, and hence description thereof is omitted.

Figure 3:
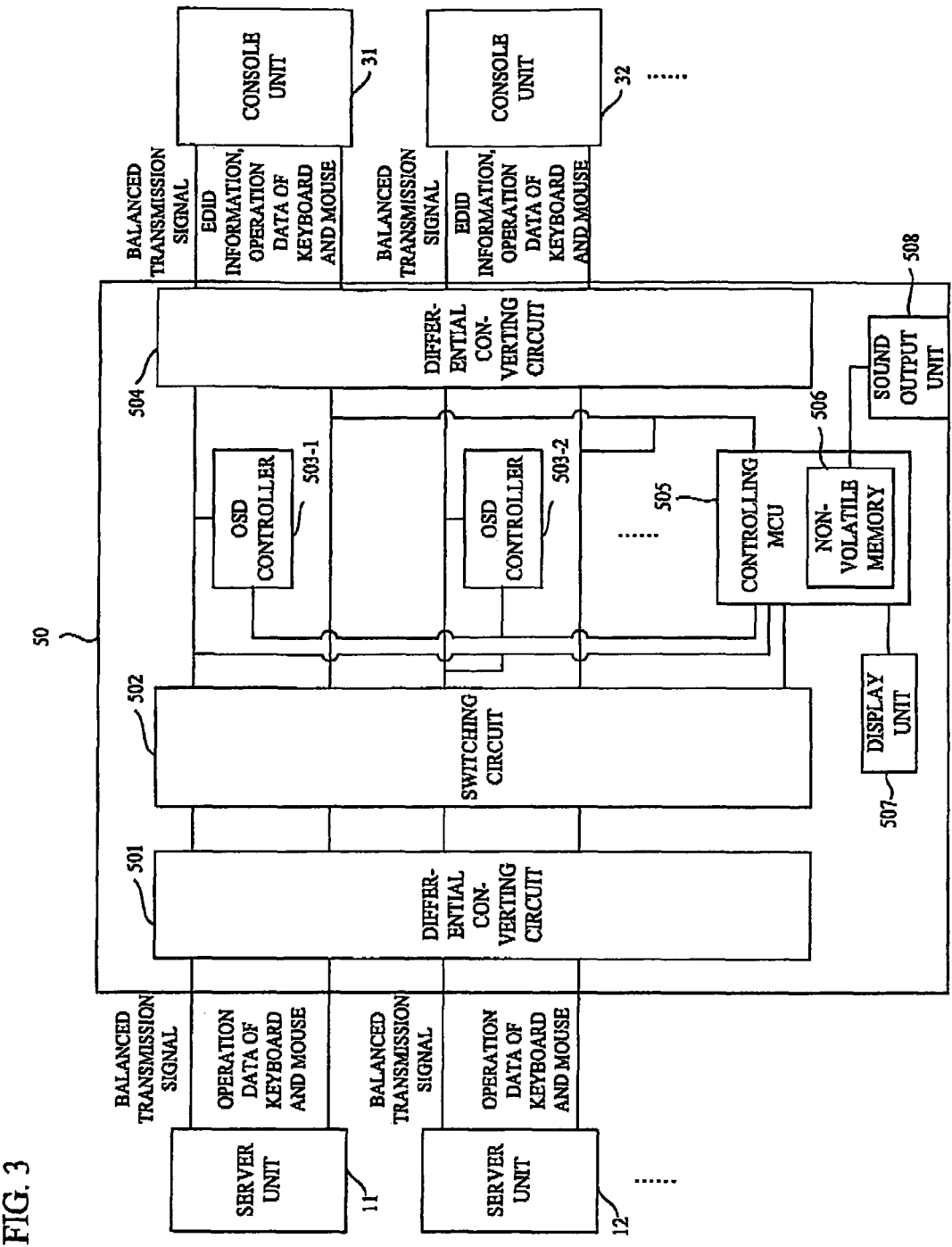
FIG. 3 is a diagram showing the construction of a main unit 50.

FIG. 3 is a diagram showing the construction of the main unit 50.

The main unit 50 includes differential converting circuits 501 and 504, a switching circuit 502, OSD controllers 503-N (N=1, 2, . . . ) (an on-screen display portion), a controlling MCU 505 (an acquiring portion, an analysis portion, a determination portion, a conversion portion, an output portion, and a control portion) including a nonvolatile memory 506, a display unit 507 (a display portion), and a sound output unit 508 (a sound output portion).

The differential converting circuits 501 converts the balanced transmission signal from each server unit into the RGB signal, the horizontal synchronizing signal and the vertical synchronizing signal, outputs the converted signals to the switching circuit 502, and converts the operation data of the keyboard and the mouse into data of a given form. The switching circuit 502 switches the destination of output of a combination of the RGB signal, the horizontal synchronizing signal and the vertical synchronizing signal, and the operation data according to a control command of the controlling MCU 505. The OSD controllers 503-N receive data of a setting screen of the OSD (On Screen Display) function stored into the nonvolatile memory 506 from the controlling MCU 505, and output the data to each console unit via the differential converting circuit 504.

The differential converting circuit 504 combines the RGB signal with the horizontal synchronizing signal and the vertical synchronizing signal, converts these signals into the balanced transmission signal, and outputs the balanced transmission signal to each console unit. The differential converting circuit 504 converts the operation data into given operation data, and outputs the given operation data to the switching circuit 502.

The controlling MCU 505 controls the action of the switching circuit 502 and the OSD controllers 503-N. The controlling MCU 505 acquires EDID (Extended Display Identification Data) information, which each monitor peculiarly has, showing a screen resolution to which the monitor can adapt, and stores the EDID information into the nonvolatile memory 506. Also, the controlling MCU 505 judges the screen resolution from the horizontal synchronizing signal and the vertical synchronizing signal, and determines whether the judged screen resolution exceeds the screen resolution of the monitor being used by a user, i.e., the screen resolution shown by the EDID information when the judged screen resolution exceeds the screen resolution shown by the EDID information, the controlling MCU 505 temporarily digitizes the RGB signal, converts the screen resolution of the digitized RGB signal into the screen resolution of the monitor being used by the user, further converts the digitized RGB signal into an analog RGB signal, and outputs the converted analog RGB signal to the differential converting circuit 504.

The nonvolatile memory 506 stores the EDID information and user authentication data, not shown. In addition, the nonvolatile memory 506 stores pieces of data of various setting screens displayed by the OSD (On Screen Display) function. The display unit 507 is composed of a liquid crystal display, for example. When the controlling MCU 505 converts the screen resolution of the RGB signal, the display unit 507 displays information to the effect that the resolution of the monitor is different from that of the original RGB signal output from the server, and the specifications which the monitor needs to display the original RGB signal output from the server. When the controlling MCU 505 converts the screen resolution of the RGB signal, the sound output unit 508 outputs a sound such as a beep, a buzzer sound, or an alarm sound which indicates that the resolution of the monitor is different from that of the original RGB signal output from the server.

Figure 4:
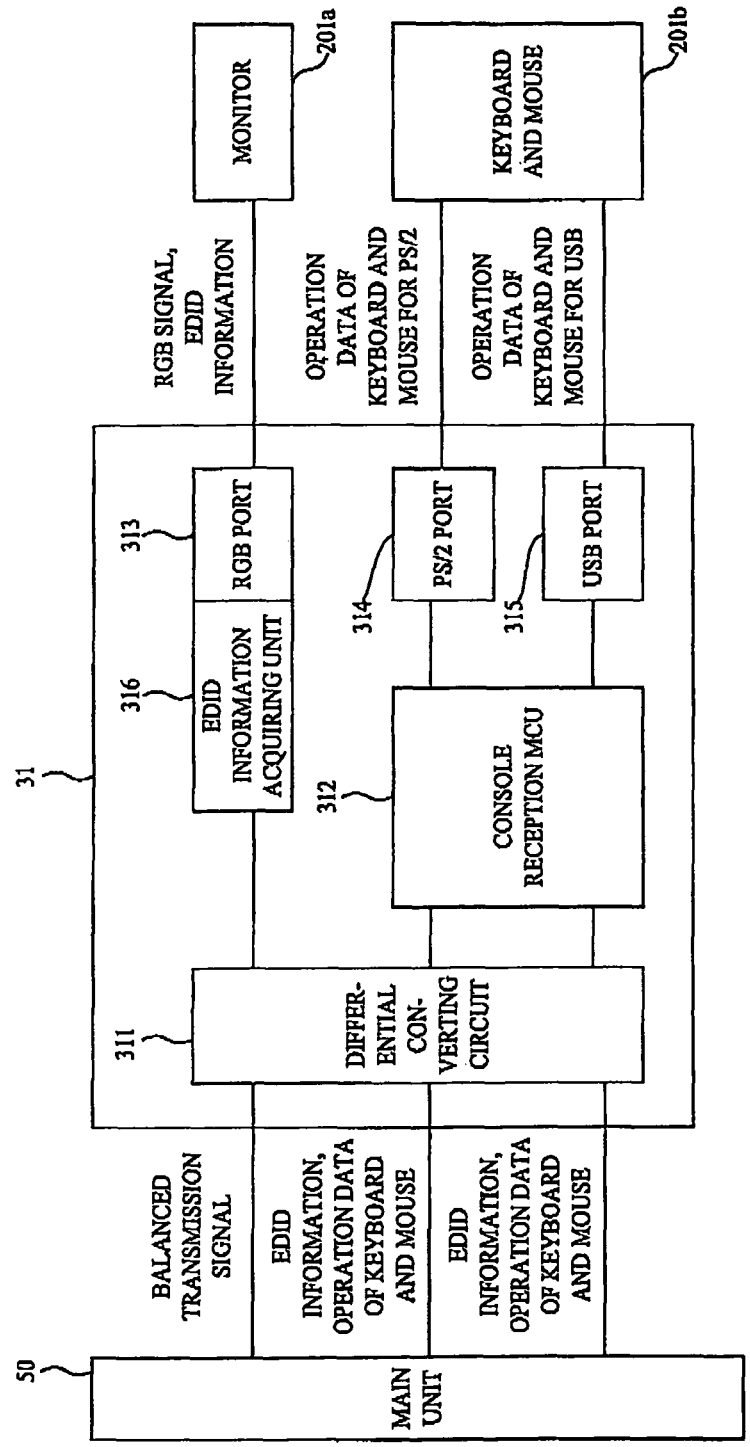
FIG. 4 is a diagram showing the construction of a console unit 31.

FIG. 4 is a diagram showing the construction of the console unit 31.

The console unit 31 includes a differential converting circuit 311, a console reception MCU (Micro Controller Unit) 312, a RGB port 313, a PS/2 port 314, a USB port 315, and an EDID information acquiring unit 316.

The differential converting circuit 311 converts the balanced transmission signal into the RGB signal, the horizontal synchronizing signal and the vertical synchronizing signal, and outputs these signals to the monitor 201a via the RGB port 313. The differential converting circuit 311 further receives operation data for the PS/2 port 314 or the USB port 315 from the keyboard or mouse 201b, converts the operation data into operation data of the keyboard or mouse, and outputs the converted operation data to the main unit 50.

The RGB port 313 is connected to the monitor 201a, and outputs the RGB signal, the horizontal synchronizing signal and the vertical synchronizing signal which are converted with the differential converting circuit 311 to the monitor 201a. The EDID information acquiring unit 316 acquires the EDID information included in the monitor 201a via the RGB port 313, and outputs the EDID information to the main unit 50 via the differential converting circuit 311. The console reception MCU 312 outputs the operation data of the keyboard or mouse to the differential converting circuit 311 via the PS/2 port 314 or the USB port 315. The console unit 31 further may include a COM port for connecting external equipment thereto. In addition, the USB port 315 can connect to USB equipment other than the keyboard or mouse. It should be noted that the construction of the other console units is the same as that of the console unit 31, and hence description thereof is omitted.

Figure 5:
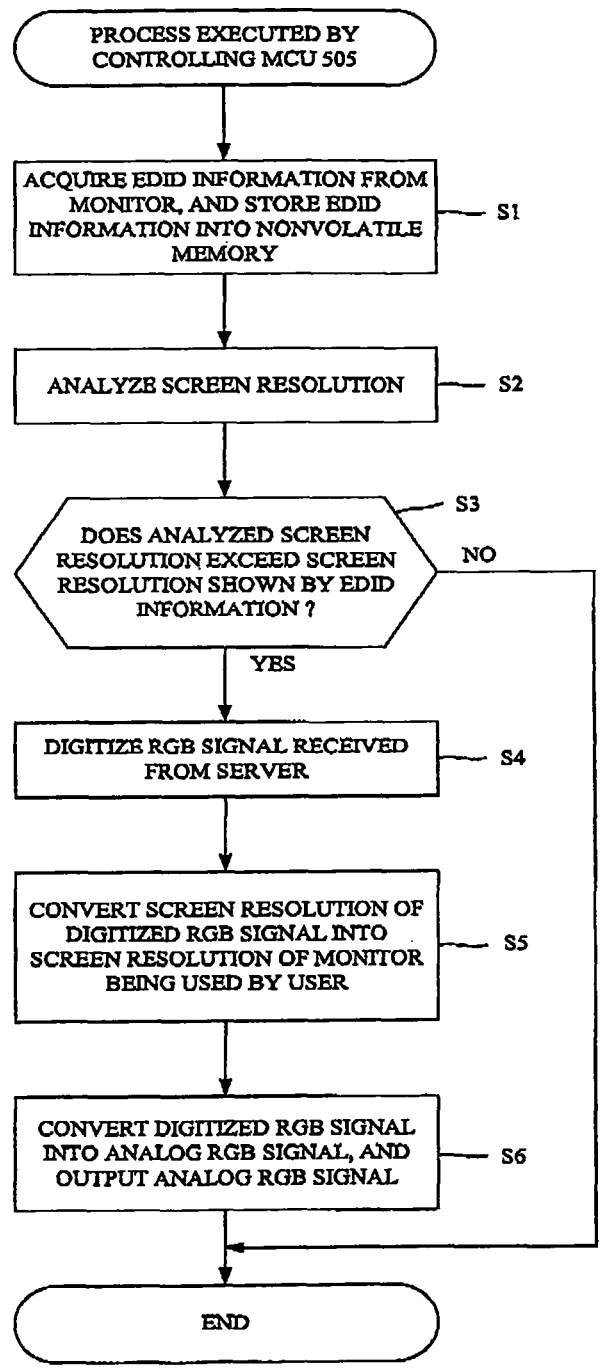
FIG. 5 is a flowchart showing a process executed by a controlling MCU 505 in the main unit 50.

FIG. 5 is a flowchart showing a process executed by the controlling MCU 505 in the main unit 50.

First, the controlling MCU 505 acquires the EDID information from the monitor connected to each console unit, and stores the EDID information as information on the monitor into the nonvolatile memory 506 (step S1).

Next, the controlling MCU 505 analyzes the screen resolution from the horizontal synchronizing signal and the vertical synchronizing signal which are received from the server being used by the user (step S2), and determines whether the analyzed screen resolution exceeds the screen resolution of the monitor being used by the user, i.e., the screen resolution shown by the EDID information (step S3).

When the answer to the determination of step S3 is "NO", i.e., the analyzed screen resolution does not exceed the screen resolution shown by the EDID information, a video can be output to the monitor being used by the user with the screen resolution of the original RGB signal output from the server, and hence the present process is terminated.

On the other hand, when the answer to the determination of step S3 is "YES", i.e., the analyzed screen resolution exceeds the screen resolution shown by the EDID information, the controlling MCU 505 temporarily digitizes the RGB signal received from the server being used by the user (step S4), and converts the screen resolution of the digitized RGB signal into the screen resolution of the monitor being used by the user (step S5). The controlling MCU 505 further converts the digitized RGB signal into the analog RGB signal, and outputs the analog RGB signal to the differential converting circuit 504 (step S6). Then, the present process is terminated.

Figure 6:
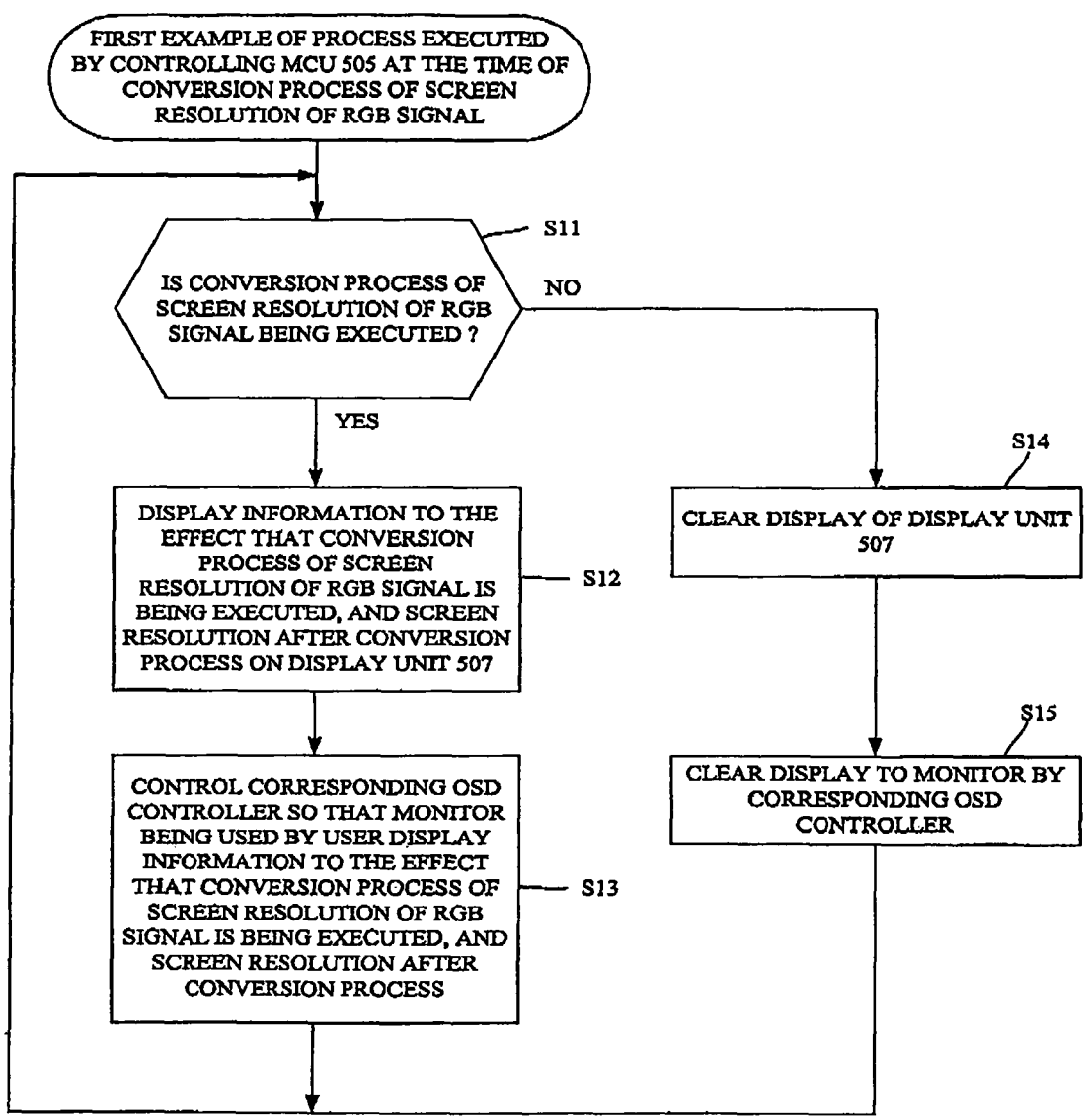
FIG. 6 is a flowchart showing a first example of a process executed by the controlling MCU 505 at the time of a conversion process of a screen resolution of a RGB signal.

FIG. 6 is a flowchart showing a first example of a process executed by the controlling MCU 505 at the time of a conversion process of the screen resolution of the RGB signal.

First, the controlling MCU 505 determines whether the conversion process of the screen resolution of the RGB signal in step S5 of FIG. 5 is being executed (step S11).

Figure 7:
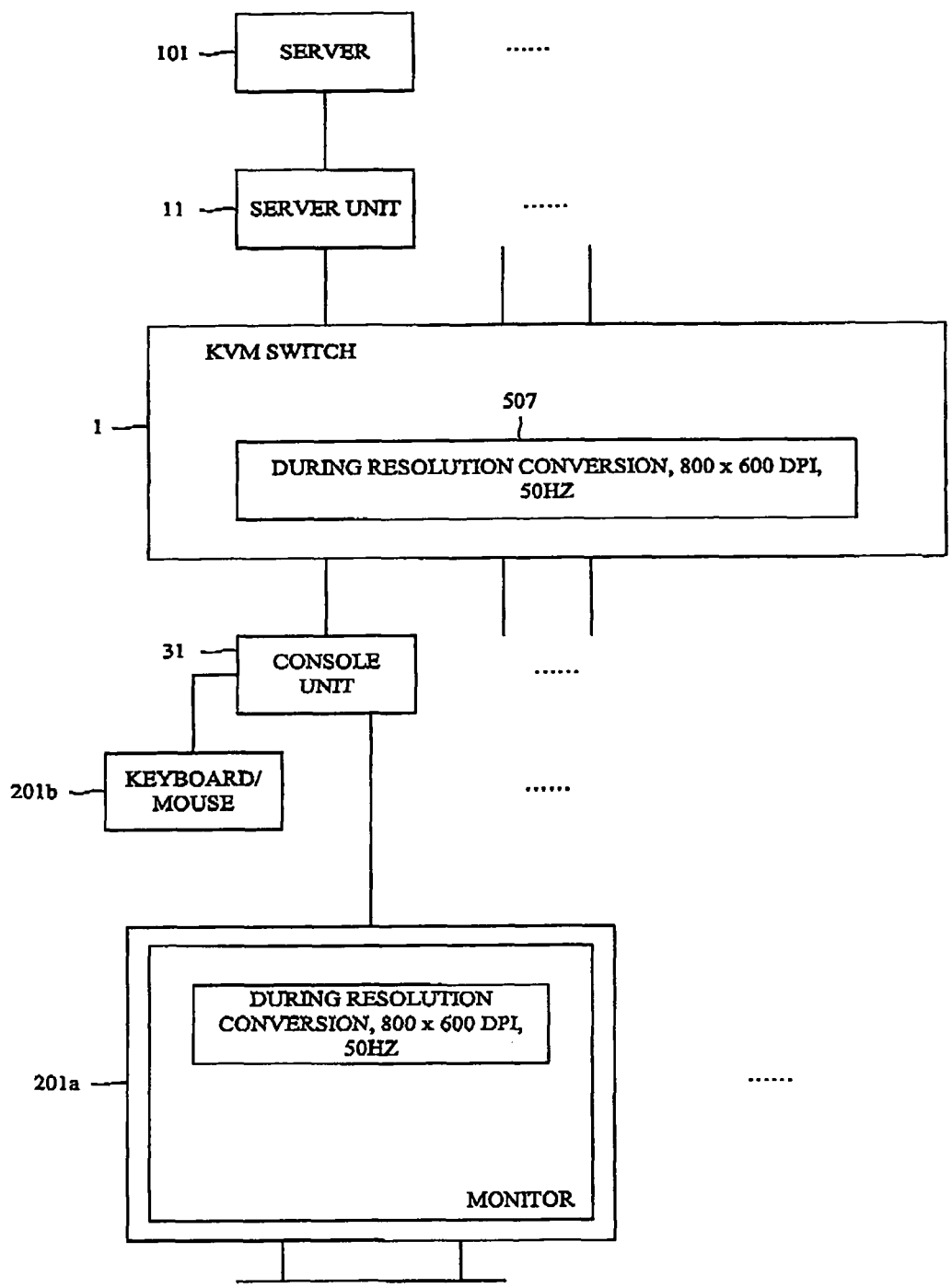
FIG. 7 is a diagram showing an example of a display unit 507 and a monitor 201a which display information to the effect that the conversion process of the screen resolution of the RGB signal is executed, and a converted screen resolution.

When the answer to the determination of step S11 is "YES", the controlling MCU 505 displays information to the effect that the conversion process of the screen resolution of the RGB signal is being executed, and the screen resolution after the conversion process on the display unit 507 (step S12). For example, when the screen resolution of the original RGB signal output from the server is 1024×768 dpi, and the screen resolution of the monitor being used by the user is 800×600 dpi, the controlling MCU 505 displays information "During resolution conversion, 800×600 dpi 50 Hz" on the display unit 507, as shown in FIG. 7. The "50 Hz" is a refresh frequency of the monitor. Also, the content displayed on the display unit 507 may be any one of the information to the effect that the conversion process of the screen resolution of the RGB signal is being executed, and the screen resolution after the conversion process.

Next, the controlling MCU 505 controls a corresponding OSD controller so that the monitor being used by the user displays the information to the effect that the conversion process of the screen resolution of the RGB signal is being executed, and the screen resolution after the conversion process (step S13). The procedure returns to step S11. For example, when the screen resolution of the original RGB signal output from the server is 1024×768 dpi, and the screen resolution of the monitor being used by the user (e.g. the monitor 201a) is 800×600 dpi, the controlling MCU 505 controls the corresponding OSD controller (e.g. the OSD controller 503-1) so that the monitor 201a being used by the user displays the information "During resolution conversion, 800×600 dpi, 50 Hz", as shown in FIG. 7. The "50 Hz" is a refresh frequency of the monitor. Also, the content displayed on the display unit 507 may be any one of the information to the effect that the conversion process of the screen resolution of the RGB signal is being executed, and the screen resolution after the conversion process.

When the answer to the determination of step S11 is "NO", for example, before or after the conversion process of the screen resolution of the RGB signal, the controlling MCU 505 clears the display of the display unit 507 (step S14), and clears the display to the monitor by the corresponding OSD controller (step S15). The procedure returns to step S11.

Figure 8:
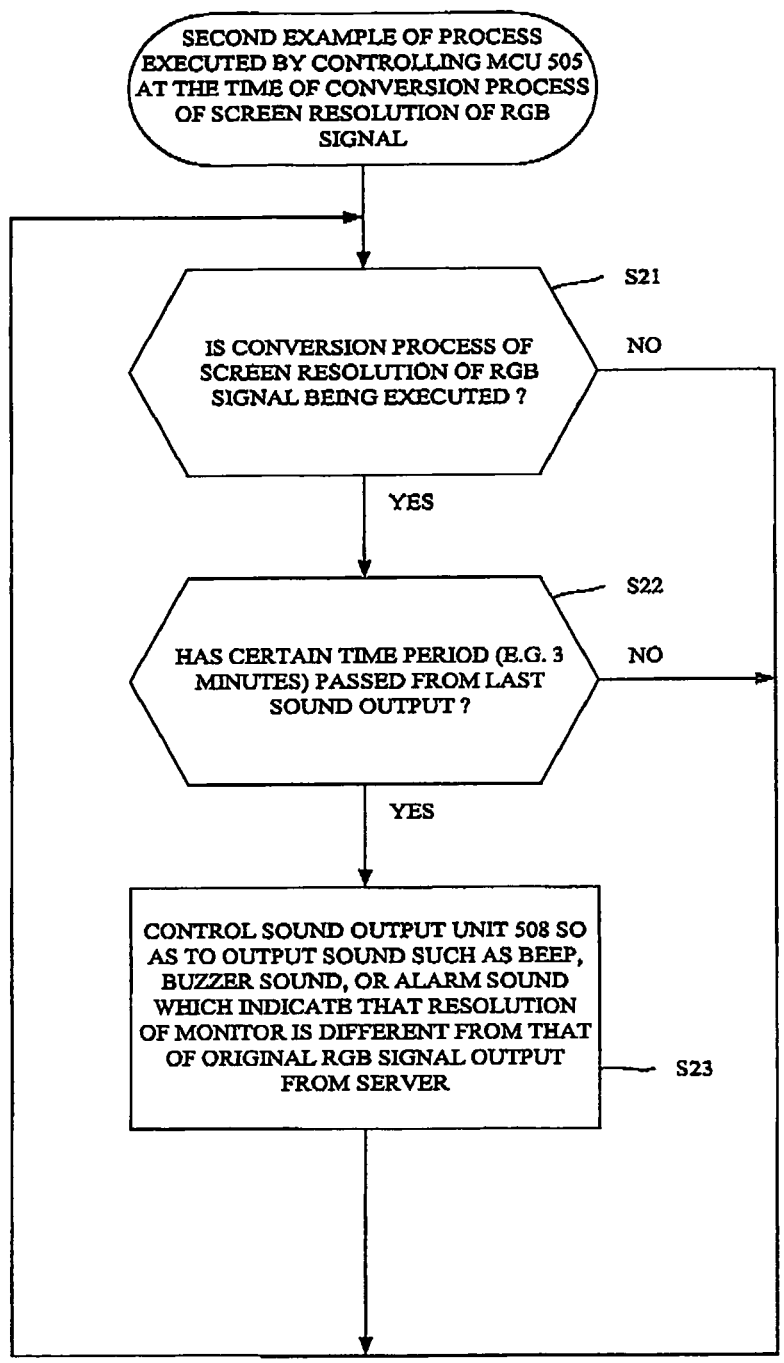
FIG. 8 is a flowchart showing a second example of the process executed by the controlling MCU 505 at the time of the conversion process of the screen resolution of the RGB signal.

FIG. 8 is a flowchart showing a second example of the process executed by the controlling MCU 505 at the time of the conversion process of the screen resolution of the RGB signal.

First, the controlling MCU 505 determines whether the conversion process of the screen resolution of the RGB signal in step S5 of FIG. 5 is being executed (step S21).

When the answer to the determination of step S21 is "YES", the controlling MCU 505 determines whether a certain time period (e.g. 3 minutes) has passed from the last sound output (step S22).

When the answer to the determination of step S22 is "YES", the controlling MCU 505 controls the sound output unit 508 so as to output the sound such as the beep, the buzzer sound, or the alarm sound which indicates that the resolution of the monitor is different from that of the original RGB signal output from the server (step S23). The procedure returns to step S21. In step S23, for example, the sound output unit 508 outputs the sound for one minute. When the answer to the determination of step S21 or step S22 is "NO" the procedure returns to step S21.

Figure 9:
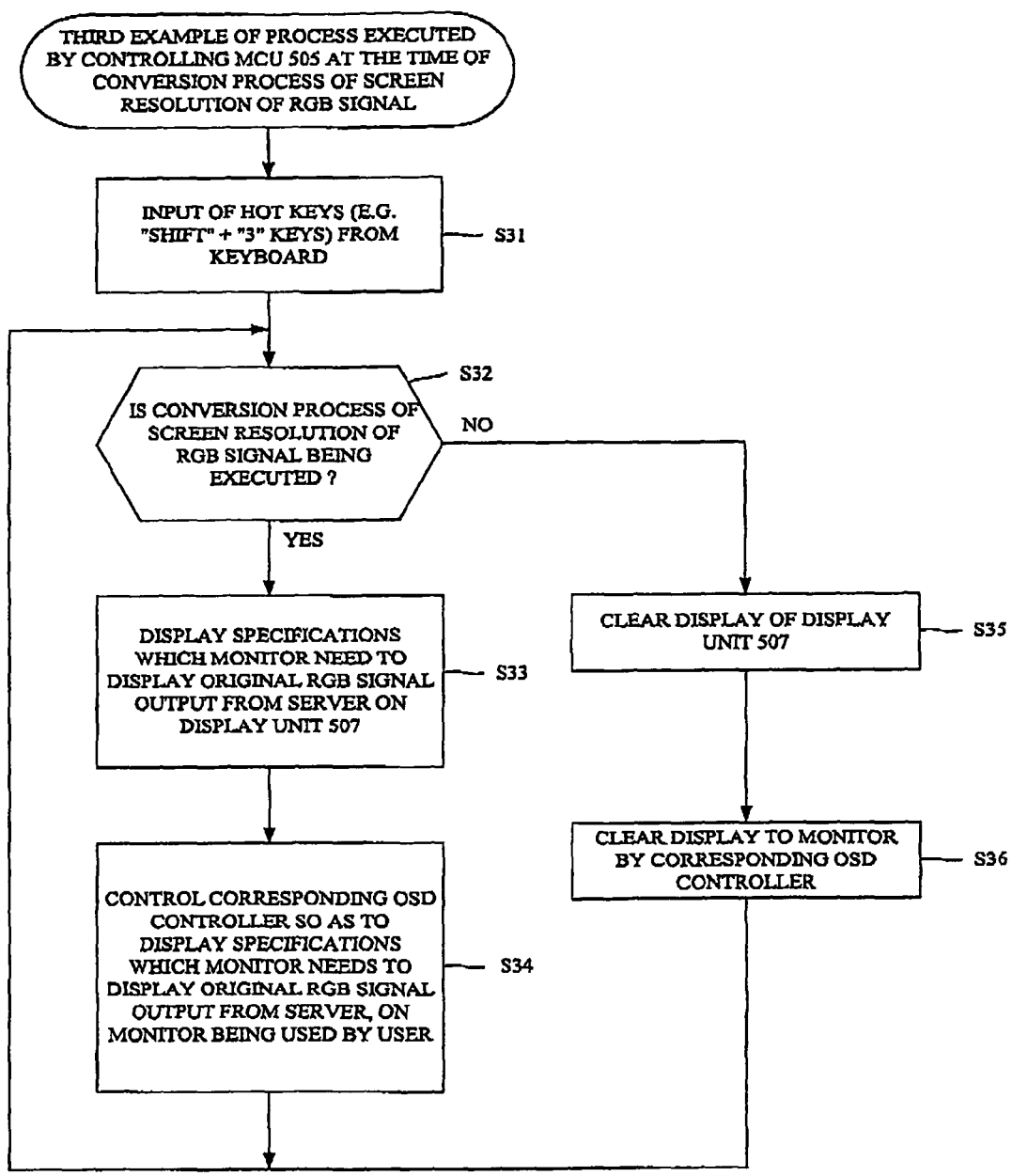
FIG. 9 is a flowchart showing a third example of the process executed by the controlling MCU 505 at the time of the conversion process of the screen resolution of the RGB signal.

FIG. 9 is a flowchart showing a third example of the process executed by the controlling MCU 505 at the time of the conversion process of the screen resolution of the RGB signal.

When an input of hot keys (e.g. "shift"+"3" keys) is executed from the keyboard being used by the user (step S31), the controlling MCU 505 determines whether the conversion process of the screen resolution of the RGB signal in step S5 of FIG. 5 is being executed (step S32).

Figure 10:
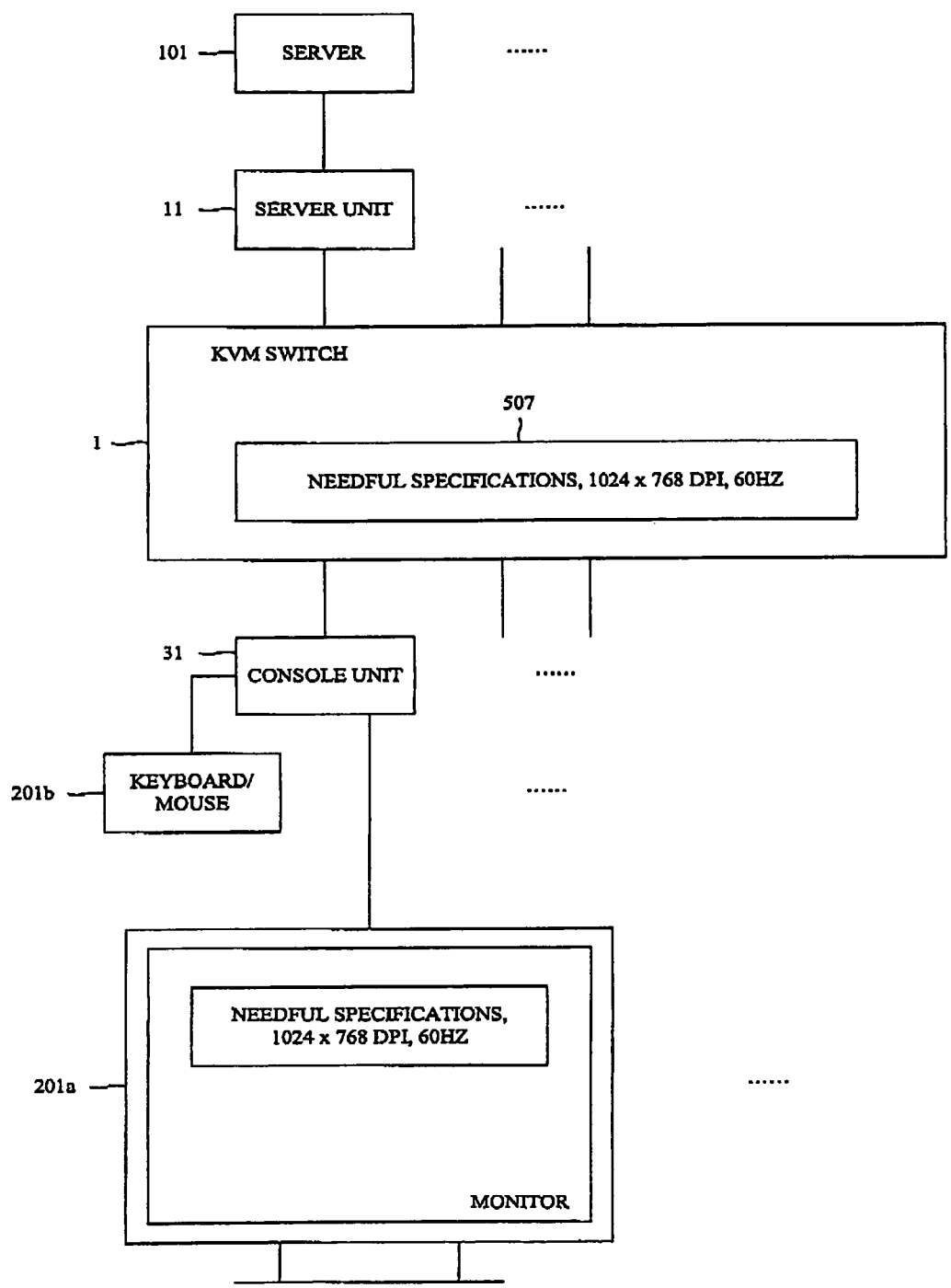
FIG. 10 is a diagram showing an example of the display unit 507 and the monitor 201a displaying specifications which a monitor needs to display an original RGB signal output from a server.

When the answer to the determination of step S32 is "YES", the controlling MCU 505 displays the specifications which the monitor needs to display the original RGB signal output from the server on the display unit 507 (step S33). For example, when the screen resolution of the original RGB signal output from the server is 1024×768 dpi, and the screen resolution of the monitor being used by the user (e.g. the monitor 201a) is 800×600 dpi, the controlling MCU 505 displays information "needful specifications, 1024×768 dpi, 60 Hz" on the display unit 507, as shown in FIG. 10. The "60 Hz" is a refresh frequency of the monitor.

Next, the controlling MCU 505 controls the corresponding OSD controller so as to display the specifications which the monitor needs to display the original RGB signal output from the server, on the monitor being used by the user (step S34). The procedure returns to step S32. For example, when the screen resolution of the original RGB signal output from the server is 1024×768 dpi, and the screen resolution of the monitor being used by the user (e.g. the monitor 201a) is 800×600 dpi, the controlling MCU 505 the corresponding OSD controller (e.g. the OSD controller 503-1) so that the monitor 201a being used by the user displays the information "needful specifications, 1024×768 dpi, 60 Hz", as shown in FIG. 10. The "60 Hz" is a refresh frequency of the monitor.

When the answer to the determination of step S32 is "NO", for example, before or after the conversion process of the screen resolution of the RGB signal, the controlling MCU 505 clears the display of the display unit 507 (step S35), and clears the display to the monitor by the corresponding OSD controller (step S36). The procedure returns to step S32.

Figure 11:
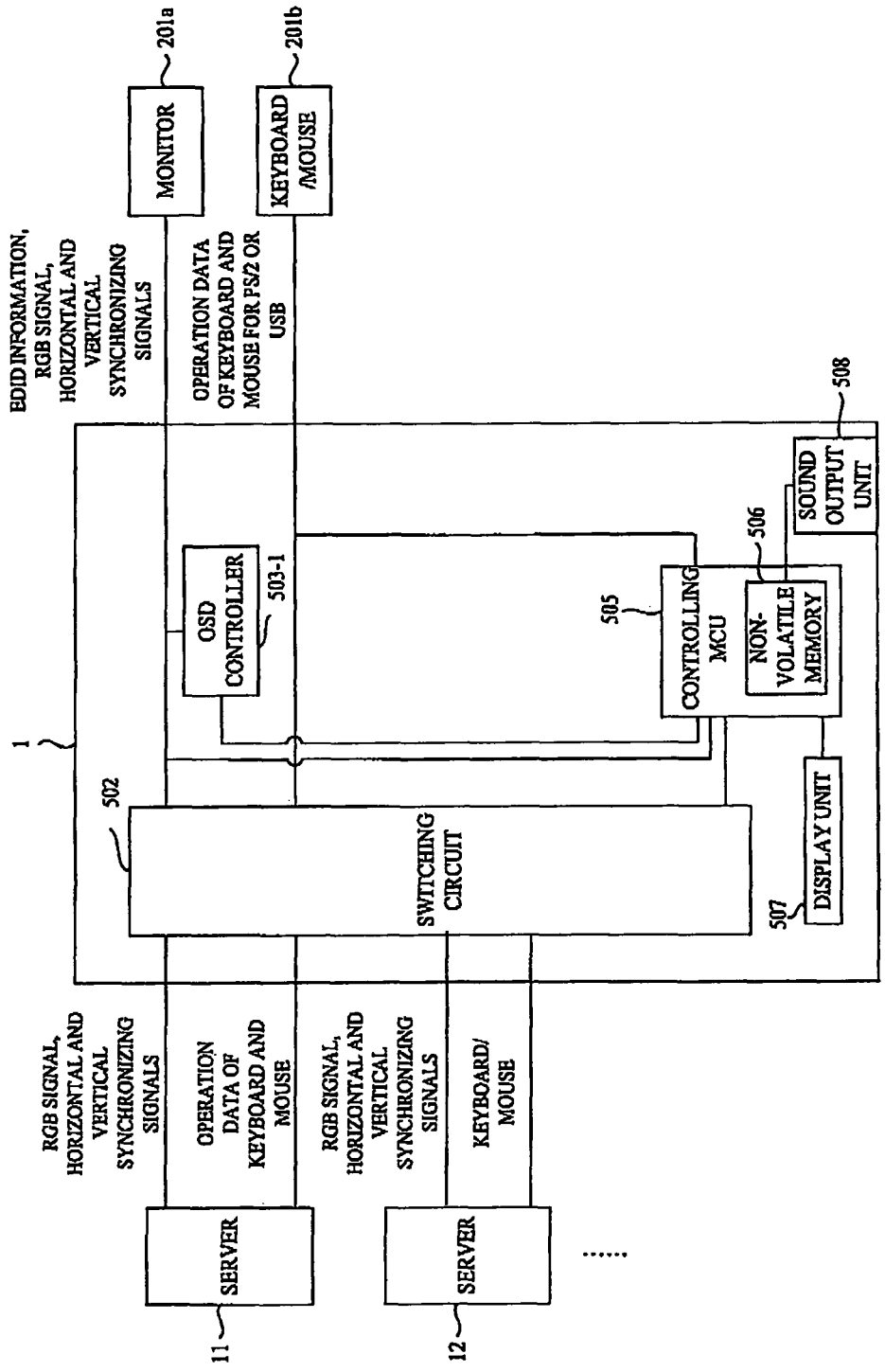
FIG. 11 is a diagram showing the construction of a variation of the information processing system including the KVM switch.

FIG. 11 is a diagram showing the construction of a variation of the information processing system including the KVM switch 1.

The KVM switch 1 in FIG. 1 is a so called multiuser KVM switch, and a relationship between the server and the console (keyboard, mouse and monitor) is a one-on-one relationship. On the contrary, in the KVM switch 1 in FIG. 11, the relationship between the server and the console (keyboard, mouse and monitor) is a one-to-many relationship. The KVM switch in FIG. 11 switches one of the plurality of servers to other server according to an instruction from the user. The processes described in FIGS. 6 to 10 can also be applied to the KVM switch 1 in FIG. 11.

In the KVM switch 1, the same number is added to the same construction as the main unit 50 in FIG. 3.

As described in detail hereinabove, according to the present embodiment, the controlling MCU 505 acquires information showing the screen resolution to which the monitor is capable of adapting, from the monitor, analyzes the screen resolution of the video signal (i.e., RGB signal) output from a corresponding server based on the horizontal synchronizing signal and the vertical synchronizing signal received from each of the plurality of servers, and determines whether the analyzed screen resolution exceeds the screen resolution shown by the acquired information. When the analyzed screen resolution exceeds the screen resolution shown by the acquired information, the controlling MCU 505 converts the screen resolution of the video signal output from the corresponding server, i.e., the analyzed screen resolution into the screen resolution shown by the acquired information, and outputs the video signal having the converted screen resolution to the monitor. Therefore, the user can use the monitor without minding the screen resolution of the video signal from each server.

Also, when the controlling MCU 505 converts the screen resolution of the video signal output from the server, the display unit 507 displays at least one of the information to the effect that the conversion process of the screen resolution of the video signal is being executed, and the screen resolution after the conversion process. Therefore, it is possible to notify the user of at least one of the information to the effect that the conversion process of the screen resolution of the video signal is being executed, and the screen resolution after the conversion process.

The display unit 507 further displays the specifications which the monitor needs to display the video signal output from the server, and it is therefore possible to notify the user of the specifications which the monitor needs to display the video signal without executing the conversion process of the screen resolution.

The OSD controller 503-N causes the monitor to display various pieces of data different from the video signal output from the server, and when the controlling MCU 505 converts the screen resolution of the video signal output from the server, the controlling MCU 505 controls the OSD controller 503-N so that the monitor displays at least one of the information to the effect that the conversion process of the screen resolution of the video signal is being executed, and the screen resolution after the conversion process. Therefore, it is possible to notify the user of at least one of the information to the effect that the conversion process of the video signal is being executed, and the screen resolution after the conversion process.

In addition, the controlling MCU 505 controls the OSD controller 503-N so that the monitor displays the specifications which the monitor needs to display the video signal output from the server, and it is therefore possible to notify the user of the specifications which the monitor needs to display the video signal without executing the conversion process of the screen resolution.

Also, when the controlling MCU 505 converts the screen resolution of the video signal output from the server, the sound output unit 508 outputs the given sound. Therefore, it is possible to notify the user of the information to the effect that the conversion process of the screen resolution of the video signal is being executed, by sound.

When the controlling MCU 505 in the main unit 50 executes the software program supplied from the outside, the same effects as those of the above described embodiment can also be achieved.

It should be noted that the present invention is not limited to the embodiment, and various modifications may be made to them without departing from the scope of the invention.

What is claimed is:

1. A KVM switch that is connected between a plurality of servers, and at least one set of a keyboard, a mouse and a monitor, comprising:
   an acquiring portion that acquires information showing a screen resolution of the monitor to which the monitor is capable of adapting, from the monitor;
   an analysis portion that analyzes a screen resolution of a video signal output from any of the plurality of servers, based on a horizontal synchronizing signal and a vertical synchronizing signal received from the server;
   a determination portion that determines whether an analyzed screen resolution of the video signal exceeds the screen resolution of the monitor shown by the acquired information;
   a conversion portion that, when the analyzed screen resolution of the video signal exceeds the screen resolution of the monitor shown by the acquired information, converts the screen resolution of the video signal to fit to the screen resolution of the monitor shown by the acquired information;
   an output portion that outputs the video signal having a converted screen resolution to the monitor; and
   a display portion that displays information indicating the screen resolution of the converted video signal, while the conversion portion is converting the screen resolution of the video signal to fit to the screen resolution of the monitor shown by the acquired information.

2. The KVM switch as claimed in claim 1, further comprising an on-screen display portion that causes the monitor to display various pieces of data different from the video signal output from the corresponding server, and
   a control portion that, when the conversion portion converts the analyzed screen resolution into the screen resolution shown by the acquired information, controls the on-screen display portion so that the monitor displays at least one of information to the effect that a conversion process of the screen resolution of the video signal is being executed, and a screen resolution after the conversion process.

3. The KVM switch as claimed in claim 1, further comprising a sound output portion that outputs a given sound when the conversion portion converts the analyzed screen resolution into the screen resolution shown by the acquired information.

4. The KVM switch as claimed in claim 2, further comprising a sound output portion that outputs a given sound when the conversion portion converts the analyzed screen resolution into the screen resolution shown by the acquired information.

5. The KVM switch as claimed in claim 2, the control portion controls the on-screen display portion so that the monitor displays specifications which the monitor needs to display the video signal output from the corresponding server.

6. A non-transitory computer readable medium causing a KVM switch to execute a process, the KVM switch being connected between a plurality of servers, and at least one set of a keyboard, a mouse and a monitor, the process comprising:

acquiring information showing a screen resolution of the monitor to which the monitor is capable of adapting, from the monitor;

analyzing a screen resolution of a video signal output from any of the plurality of servers, based on a horizontal synchronizing signal and a vertical synchronizing signal received from the server;

determining whether an analyzed screen resolution of the video signal exceeds the screen resolution of the monitor shown by the acquired information;

converting, when the analyzed screen resolution of the video signal exceeds the screen resolution shown by the acquired information, the screen resolution of the video signal to fit to the screen resolution shown by the acquired information;

outputting the video signal having a converted screen resolution to the monitor; and displaying, while the screen resolution of the video signal is being converted to fit to the screen resolution of the monitor shown by the acquired information, information indicating the screen resolution of the converted video signal.

7. A KVM switch that is connected between a server and a console that includes a monitor, the KVM switch comprising:

an acquiring portion that acquires information showing a screen resolution of the monitor to which the monitor is capable of adapting, from the monitor;

an analysis portion that analyzes a screen resolution of a video signal output from any of a plurality of servers, based on a horizontal synchronizing signal and a vertical synchronizing signal received from the server;

a determination portion that determines whether an analyzed screen resolution of the video signal exceeds the screen resolution of the monitor shown by the acquired information;

a conversion portion that, when the analyzed screen resolution of the video signal exceeds the screen resolution of the monitor shown by the acquired information, converts the screen resolution of the video signal to fit to the screen resolution of the monitor shown by the acquired information;

an output portion that outputs the video signal having a converted screen resolution to the monitor; and a display portion that displays information;

wherein, when the conversion portion is converting the screen resolution of the received video signal to fit to the acquired screen resolution, information indicating the screen resolution of the converted video signal is displayed on the monitor and the display portion at the same time.

\* \* \* \* \*